(12) United States Patent
DeLuca

(10) Patent No.: US 8,972,762 B2
(45) Date of Patent: Mar. 3, 2015

(54) COMPUTING DEVICES AND METHODS FOR RESETTING INACTIVITY TIMERS ON COMPUTING DEVICES

(75) Inventor: Michael Joseph DeLuca, Boca Raton, FL (US)

(73) Assignee: BlackBerry Limited, Waterloo (CA)

(*) Notice: Subject to any disclaimer, the term of this patent is extended or adjusted under 35 U.S.C. 154(b) by 310 days.

(21) Appl. No.: 13/546,397

(22) Filed: Jul. 11, 2012

(65) Prior Publication Data

US 2014/0019743 A1    Jan. 16, 2014

(51) Int. Cl.
 G06F 1/14   (2006.01)
 G06F 1/32   (2006.01)
 H04W 52/02  (2009.01)

(52) U.S. Cl.
 CPC .......... *G06F 1/3231* (2013.01); *H04W 52/0251* (2013.01)
 USPC ............................ 713/323; 713/324; 713/502

(58) Field of Classification Search
 CPC ... G06F 1/3209; G06F 1/3228; G06F 1/3231; H04W 52/0216; H04W 52/0225; H04W 52/0251; H04W 52/0254; H04L 67/22; H04L 67/24
 See application file for complete search history.

(56) References Cited

U.S. PATENT DOCUMENTS

| | | | |
|---|---|---|---|
| 4,945,556 A | 7/1990 | Namekawa | |
| 5,557,732 A | 9/1996 | Thompson | |
| 5,864,765 A | 1/1999 | Barvesten | |
| 5,925,129 A | 7/1999 | Combs et al. | |
| 5,987,440 A | 11/1999 | O'Neil et al. | |
| 5,987,611 A | 11/1999 | Freund | |
| 6,052,735 A | 4/2000 | Ulrich et al. | |
| 6,105,132 A | 8/2000 | Fritch et al. | |
| 6,189,105 B1 | 2/2001 | Lopes | |
| 6,233,446 B1 | 5/2001 | Do | |
| 6,292,798 B1 | 9/2001 | Dockter et al. | |
| 6,351,816 B1 | 2/2002 | Mueller et al. | |
| 6,360,322 B1 | 3/2002 | Grawrock | |
| 6,401,209 B1 | 6/2002 | Klein | |

(Continued)

FOREIGN PATENT DOCUMENTS

| | | | |
|---|---|---|---|
| CA | 2498605 A1 | 8/2005 | |
| CA | 2709294 A1 | 8/2005 | |

(Continued)

OTHER PUBLICATIONS

European Patent Office, "Extended European Search Report" for EP Application No. 12175962.5, dated Dec. 4, 2012, 9 pages.

(Continued)

*Primary Examiner* — Dennis M Butler
(74) *Attorney, Agent, or Firm* — Hanley, Flight & Zimmerman, LLC

(57) ABSTRACT

Computing devices and methods for resetting an inactivity timer of each of a first and second computing device are described. In one embodiment, the method comprises establishing a communication channel between the first computing device and the second computing device, receiving activity input responsive to a user interaction at the first computing device, resetting the inactivity timer of the first computing device, and transmitting a notification via the communication channel to the second computing device that the activity input was received at the first computing device, the inactivity timer of the second computing device being reset in response to receipt of the notification.

39 Claims, 9 Drawing Sheets

(56) References Cited

U.S. PATENT DOCUMENTS

| | | | |
|---|---|---|---|
| 6,405,202 B1 | 6/2002 | Britton et al. | |
| 6,412,070 B1 | 6/2002 | Van Dyke et al. | |
| 6,516,421 B1 | 2/2003 | Peters | |
| 6,523,126 B1* | 2/2003 | Brabenac | 713/323 |
| 6,560,711 B1 | 5/2003 | Given et al. | |
| 6,647,388 B2 | 11/2003 | Numao et al. | |
| 6,651,173 B1 | 11/2003 | Rodriguez et al. | |
| 6,668,323 B1 | 12/2003 | Challener et al. | |
| 6,757,821 B1 | 6/2004 | Akiyama et al. | |
| 6,772,350 B1 | 8/2004 | Belani et al. | |
| 6,795,688 B1 | 9/2004 | Plasson et al. | |
| 6,795,967 B1 | 9/2004 | Evans et al. | |
| 6,799,209 B1* | 9/2004 | Hayton | 709/223 |
| 6,886,038 B1 | 4/2005 | Tabbara et al. | |
| 6,957,330 B1 | 10/2005 | Hughes | |
| 6,978,385 B1 | 12/2005 | Cheston et al. | |
| 6,999,562 B2 | 2/2006 | Winick | |
| 7,246,374 B1 | 7/2007 | Simon et al. | |
| 7,305,709 B1 | 12/2007 | Lymer et al. | |
| 7,331,058 B1 | 2/2008 | Gladney | |
| 7,400,878 B2 | 7/2008 | Hassan et al. | |
| 7,437,578 B2 | 10/2008 | Menzl | |
| 7,496,667 B2 | 2/2009 | Adam et al. | |
| 7,555,776 B1 | 6/2009 | Lymer et al. | |
| 7,562,218 B2 | 7/2009 | Kirkup et al. | |
| 7,574,200 B2 | 8/2009 | Hassan et al. | |
| 7,669,228 B2 | 2/2010 | Moon et al. | |
| 7,734,284 B2 | 6/2010 | Adams et al. | |
| 7,840,621 B2 | 11/2010 | Yoshizawa | |
| 7,869,789 B2 | 1/2011 | Hassan et al. | |
| 8,063,872 B2 | 11/2011 | Forstall et al. | |
| 8,074,078 B2 | 12/2011 | Brown et al. | |
| 2001/0047485 A1 | 11/2001 | Brown et al. | |
| 2002/0019944 A1 | 2/2002 | Kou | |
| 2002/0031230 A1 | 3/2002 | Sweet et al. | |
| 2002/0087880 A1 | 7/2002 | Rhoades et al. | |
| 2002/0095414 A1 | 7/2002 | Barnett et al. | |
| 2002/0095497 A1 | 7/2002 | Satagopan et al. | |
| 2002/0112155 A1 | 8/2002 | Martherus et al. | |
| 2002/0120578 A1 | 8/2002 | Sy | |
| 2002/0196274 A1 | 12/2002 | Comfort et al. | |
| 2003/0005317 A1 | 1/2003 | Audebert et al. | |
| 2003/0026220 A1 | 2/2003 | Uhlik et al. | |
| 2003/0065676 A1 | 4/2003 | Gbadegesin et al. | |
| 2003/0093698 A1 | 5/2003 | Challener et al. | |
| 2003/0120948 A1 | 6/2003 | Schmidt et al. | |
| 2003/0126437 A1 | 7/2003 | Wheeler et al. | |
| 2003/0132958 A1 | 7/2003 | Himmel et al. | |
| 2003/0163685 A1 | 8/2003 | Paatero | |
| 2003/0177389 A1 | 9/2003 | Albert et al. | |
| 2003/0226015 A1 | 12/2003 | Neufeld et al. | |
| 2003/0236983 A1 | 12/2003 | Mihm | |
| 2004/0001101 A1 | 1/2004 | Trajkovic et al. | |
| 2004/0083382 A1 | 4/2004 | Markham et al. | |
| 2004/0100983 A1 | 5/2004 | Suzuki et al. | |
| 2004/0209608 A1 | 10/2004 | Kouznetsov et al. | |
| 2005/0071433 A1 | 3/2005 | Shah | |
| 2005/0154935 A1 | 7/2005 | Jin | |
| 2005/0164687 A1 | 7/2005 | DiFazio | |
| 2005/0204138 A1 | 9/2005 | Chiu | |
| 2005/0210270 A1 | 9/2005 | Rohatgi et al. | |
| 2005/0245272 A1 | 11/2005 | Spaur et al. | |
| 2005/0250456 A1* | 11/2005 | Motohashi | 455/92 |
| 2006/0048236 A1 | 3/2006 | Multerer et al. | |
| 2006/0059556 A1 | 3/2006 | Royer | |
| 2006/0070114 A1 | 3/2006 | Wood et al. | |
| 2006/0129848 A1 | 6/2006 | Paksoy et al. | |
| 2006/0129948 A1 | 6/2006 | Hamzy et al. | |
| 2006/0156026 A1 | 7/2006 | Utin | |
| 2006/0212589 A1 | 9/2006 | Hayer et al. | |
| 2007/0073694 A1 | 3/2007 | Picault et al. | |
| 2007/0143415 A1 | 6/2007 | Daigle | |
| 2007/0174389 A1 | 7/2007 | Armstrong et al. | |
| 2007/0214495 A1 | 9/2007 | Royer et al. | |
| 2007/0245026 A1 | 10/2007 | Martin et al. | |
| 2007/0259673 A1 | 11/2007 | Willars et al. | |
| 2007/0274233 A1* | 11/2007 | Ptashek et al. | 370/254 |
| 2007/0277127 A1 | 11/2007 | Carlson | |
| 2008/0005561 A1 | 1/2008 | Brown et al. | |
| 2008/0052382 A1 | 2/2008 | Dinh et al. | |
| 2008/0081609 A1 | 4/2008 | Burgan et al. | |
| 2008/0109876 A1 | 5/2008 | Hitomi et al. | |
| 2008/0134299 A1 | 6/2008 | Posamentier | |
| 2008/0207167 A1* | 8/2008 | Bugenhagen | 455/411 |
| 2008/0222711 A1 | 9/2008 | Michaelis | |
| 2008/0305771 A1 | 12/2008 | Yajima et al. | |
| 2009/0119785 A1 | 5/2009 | Challener et al. | |
| 2009/0282247 A1 | 11/2009 | Kirkup et al. | |
| 2010/0024020 A1 | 1/2010 | Baugher et al. | |
| 2010/0049881 A1* | 2/2010 | Manor et al. | 710/18 |
| 2010/0157867 A1 | 6/2010 | Babin | |
| 2010/0180330 A1 | 7/2010 | Zhu et al. | |
| 2010/0319053 A1 | 12/2010 | Gharabally | |
| 2011/0051176 A1 | 3/2011 | Kang et al. | |
| 2011/0105073 A1 | 5/2011 | Hassan et al. | |
| 2011/0145833 A1 | 6/2011 | De Los Reyes et al. | |
| 2011/0150202 A1* | 6/2011 | Cheng | 379/207.03 |
| 2011/0185202 A1 | 7/2011 | Black et al. | |
| 2011/0307941 A1 | 12/2011 | Dhanakshirur et al. | |
| 2011/0314467 A1 | 12/2011 | Pearson | |
| 2012/0042359 A1 | 2/2012 | Kuroda | |
| 2012/0054853 A1 | 3/2012 | Gupta et al. | |
| 2012/0079110 A1 | 3/2012 | Brown et al. | |
| 2012/0079586 A1 | 3/2012 | Brown et al. | |
| 2012/0079609 A1 | 3/2012 | Bender et al. | |
| 2012/0131663 A1 | 5/2012 | Anchan | |
| 2012/0202527 A1 | 8/2012 | Obradovich et al. | |
| 2012/0284297 A1 | 11/2012 | Aguera-Arcas et al. | |

FOREIGN PATENT DOCUMENTS

| | | |
|---|---|---|
| CA | 2709295 A1 | 8/2005 |
| CA | 2509119 A1 | 2/2006 |
| CN | 101523878 A | 9/2009 |
| EP | 0973350 | 1/2000 |
| EP | 0990969 A1 | 4/2000 |
| EP | 1628183 A1 | 2/2006 |
| EP | 1638303 | 3/2006 |
| EP | 1569064 B1 | 4/2007 |
| EP | 1936530 A2 | 6/2008 |
| EP | 2028601 | 2/2009 |
| EP | 2116952 A1 | 11/2009 |
| EP | 2284762 A2 | 2/2011 |
| EP | 1760622 B1 | 5/2012 |
| EP | 2685350 | 1/2014 |
| GB | 2408179 A | 5/2005 |
| WO | 9905814 A2 | 2/1999 |
| WO | 0059225 | 10/2000 |
| WO | 2005045550 A2 | 5/2005 |
| WO | 2009014975 A1 | 1/2009 |

OTHER PUBLICATIONS

European Response for European Patent Application No. 12175962.5, dated Aug. 28, 2013 (21 pages).
United States Request for Continued Examination and Response for U.S. Appl. No. 13/242,451, dated Sep. 5, 2013 (13 pages).
United States Final Office Action for U.S. Appl. No. 13/242,451, dated Jun. 5, 2013 (13 pages).
United States Response for U.S. Appl. No. 13/242,451, dated Mar. 6, 2013 (12 pages).
United States Non-Final Office Action for U.S. Appl. No. 13/242,451, dated Dec. 7, 2012 (10 pages).
United States Preliminary Amendment for U.S. Appl. No. 13/242,589, dated Dec. 13, 2012 (7 pages).
United States Non-Final Office Action for U.S. Appl. No. 13/242,451, dated Oct. 3, 2013 (10 pages).
Olzak, Tom, IT Security (Dec. 15, 2008) "Use free sandboxing software to isolate risky behaviour". http://www.techrepublic.com/blog/security/use-free-sandboxing-software-to-isolate-risky-behavior/693; 8 pages.
Wikipedia "Operating system-level virtualization" http://en.

(56) References Cited

OTHER PUBLICATIONS wikipedia.org/wiki/Operating_system-level_virtualization ; Jan. 11, 2009; 3 pages.
Wikipedia "Solaris Containers" http://en.wikipedia.org/wiki/Solaris_Containers; Apr. 1, 2010; 4 pages.
Morello, John (Oct. 2006). "Communication & Collaboration: Building an Emergency Operations Center on Groove and SharePoint". TechNet Magazine. Microsoft Corporation. http://technet.microsoft.com/en-us/magazine/2006.10.grooveandsharepoint.aspx.; 7 pages.
Microsoft SharePoint Workspace http://en.wikipedia.org/wiki/Microsoft_SharePoint_Workspace; retrieved on Jan. 30, 2012; 8 pages.
Chou, Yung (Oct. 2006). "Communication & Collaboration: Get into the Groove: Solutions for Secure and Dynamic Collaboration". TechNet Magazine. Microsoft Corporation. http://technet.microsoft.com/en-us/magazine/2006.10.intothegroove.aspx.; 6 pages.
Lawson, Stephen, IDG News (Mar. 24, 2011) "PlayBook Will Need BlackBerry Tethering, to Start". PCWorld. http://www.pcworld.com/article/223274/playbook_will_need_blackberry_tethering_to_start.html; 5 pages.
Atkins, Lucas (Mar. 11, 2011) "First Look at BlackBerry Mobile HotSpot, Tethering for OS 6.1". http://n4bb.com/5027/first-look-at-blackberry-mobile-hotspot-tethering-os-6-1; 7 pages.
Hamblen, Matt, Computerworld (Jan. 13, 2011) "PlayBook to allow tethering to BlackBerry smartphones" http://www.computerworld.com/s/article/9204960/Playbook_to_allow_tethering_to_BlackBerry_smartphones; 4 pages.
Wikipedia, "Disk encryption" retrieved from http://en.wikipedia.org/wiki/Full_disk_encryption; retrieved on Jan. 30, 2012; 5 pages.
"Customizing User Interaction in Smart Phones", Pervasive Computing, IEEE CS (2006) pp. 81-90 (URL:http://www.idi.ntnu.no/grupper/su/bibliography/pdf/2006/Korpipaa2006pc.pdf; 9 pages.
"Supporting Mobile Privacy and Security through Sensor-Based Context Detection", Julian Seifert, Second International Workshop on Security and Privacy in Spontaneous Interaction and Mobile Phone Use, May 17, 2010, Finland (URL: http://www.medien.ifi.lmu.de/iwssi2010/papers/iwssi-spmu2010-seifert.pdf); 2 pages.
EagleVision: A Pervasive Mobile Device Protection System, Ka Yang, Nalin Subramanian, Daji Qiao, and Wensheng Zhang, Iowa State University (URL: http://www.cs.iastate.edu/~wzhang/papers/eagleVision.pdf); 2009; 10 pages.

"Using context-profiling to aid access control decisions in mobile devices", Gupta et al., Nokia Research Center (URL: http://www.cerias.purdue.edu/assets/symposium/2011-posters/372-C48.pdf); 2011; 1 page. Please refer to the 1-page. file named 372-C48.pdf.
Ni, Yang et al, "DiffUser: Differentiated User Access Control on Smartphones". IEEE 6th International Conference on Mobile Adhoc and Sensor Systems, MASS '09, Oct. 12-15, 2009, pp. 1012-1017.
Oprea et al, "Securing a remote terminal application with a mobile trusted device", 20th Annual Computer Security Applications Conference, Dec. 6-10, 2004, pp. 438-447.
Smartphone Security Beyond Lock and Wipe (Jun. 10, 2010): http://www.enterprisemobiletoday.com/article.php/3887006; 6 pages.
Basic Access Authentication (Jan. 23, 2010): http://en.wikipedia.org/wiki/Basic_access_authentication; 3 pages.
Digital Access Authentication (Dec. 23, 2009): http://en.wikipedia.org/wiki/Digest_access_authentication; 6 pages.
Cross-site request forgery (Nov. 30, 2008): http://en.wikipedia.org/wiki/Cross-site_request_forgery; 3 pages.
Co-pending U.S. Appl. No. 13/242,451, "Method and Apparatus for Differentiated Access Control", filed Sep. 23, 2011.
Co-pending U.S. Appl. No. 13/242,589, "Method and Apparatus for Differentiated Access Control", filed Sep. 23, 2011.
Amendment. U.S. Appl. No. 13/242,451. Dated: Dec. 19, 2013. (11 pages).
Final Office Action. U.S. Appl. No. 13/242,451. Dated: Mar. 21, 2014. (11 pages).
Amendment. U.S. Appl. No. 13/242,451. Dated: Jun. 19, 2014. (15 pages).
Request for Continued Examination (RCE). U.S. Appl. No. 13/242,451. Dated: Jun. 19, 2014. (3 pages).
Supplemental Response. U.S. Appl. No. 13/242,451. Dated: Jul. 3, 2014. (6 pages).
Notice of Allowance. U.S. Appl. No. 13/242,451. Dated: Jul. 18, 2014. (9 pages).
Office Action. Canadian Patent Application No. 2,820,107. Dated Oct. 6, 2014 (3 pages).
Extended European Search Report on European Application No. 11826253.4 dated Jul. 29, 2014 (5 pages).
Extended European Search Report on European Application No. 11826254.2 dated Jul. 29, 2014 (5 pages).

\* cited by examiner

COMPUTING DEVICES AND METHODS FOR RESETTING INACTIVITY TIMERS ON COMPUTING DEVICES

FIELD

Embodiments disclosed herein relate generally to computing devices and methods for resetting inactivity timers of computing devices.

BACKGROUND

Some computing devices are configured to perform certain actions when a predetermined period of time elapses without receiving input from a user of the computing device. For example, a computing device may enter a sleep state or a locked state, or may adjust certain settings, such as display settings, in response to a lack of user input being received at that computing device. An inactivity timer may be used by a computing device to measure the amount of time that has elapsed since the most recent receipt of user input, the inactivity timer expiring after a predetermined period of time has elapsed without the timer being reset by a receipt of user input.

BRIEF DESCRIPTION OF THE DRAWINGS

For a better understanding of the described embodiments and to show more clearly how they may be carried into effect, reference will now be made, by way of example, to the accompanying drawings in which.

DESCRIPTION OF EXAMPLE EMBODIMENTS

Figure 1:
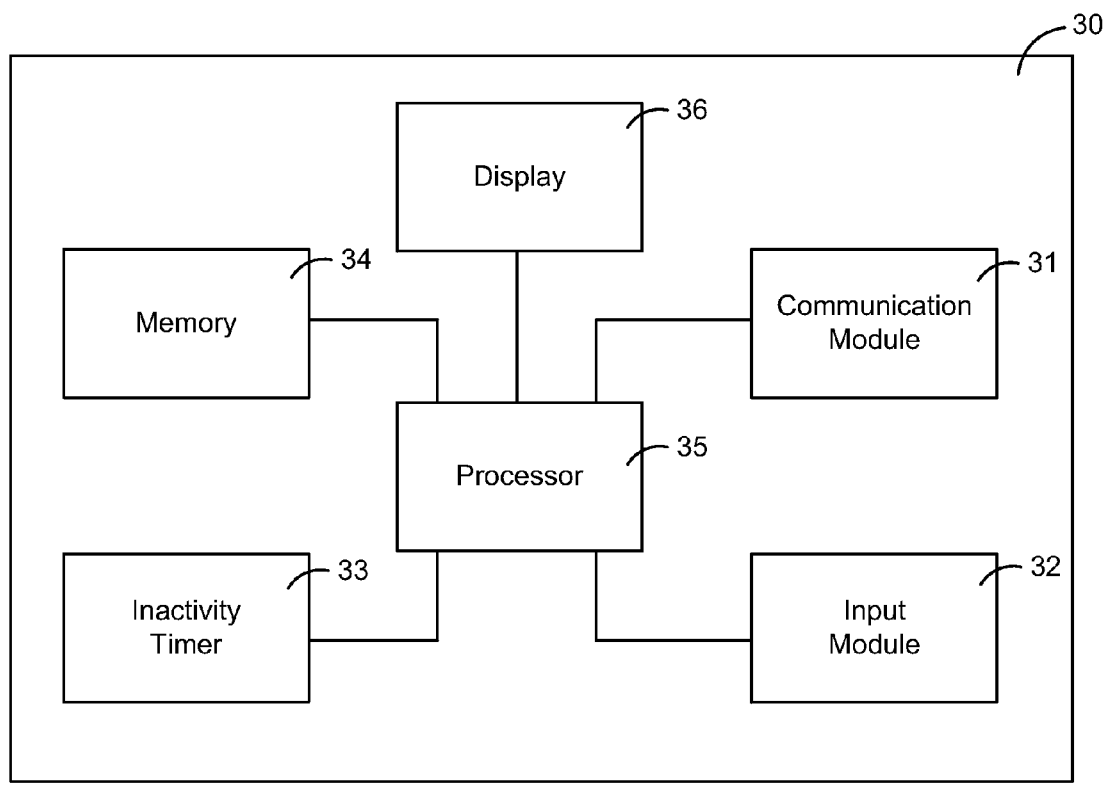
FIG. 1 is a block diagram of a computing device in accordance with at least one embodiment.

As computing devices become more prevalent, it is increasingly common for a user to be interacting, directly or indirectly, with more than one computing device at a given time.

Embodiments disclosed herein relate generally to computing devices and methods for resetting an inactivity timer of each of two different computing devices, connected to one another over a communication channel, in response to user input being received at either of the two computing devices.

Many computing devices are configured to monitor the receipt of input from a user at the computing device, where a sustained lack of user input is presumed to indicate that the user is no longer interacting with the computing device. For example, if a laptop computer is not receiving input via its keyboard or trackpad, one might presume (correctly or incorrectly) that a user is no longer interacting with the laptop. Accordingly, the computing device may take certain actions in response to the presumption that the computing device is no longer being used. For example, the computing device may respond by taking actions to provide enhanced security (e.g. by 'locking out' access to sensitive data and requiring input of a password to regain access), to provide enhanced privacy (e.g. by activating a "screensaver" to replace the information being shown on the display), to provide power savings (e.g. by dimming or disabling the display, or by entering a sleep state), or a combination of any of these or other actions. While these inactivity responses may be desirable when the presumption of non-use of the computing device is correct, such inactivity responses may be inconvenient to a user when the presumption is incorrect (e.g. the user may be viewing something being displayed at the computing device, even though the user is not actively providing input to that computing device), as these inactivity responses may interrupt their use of the computing device.

In order to monitor user input (and in particular, a lack thereof), a computing device may use an inactivity timer to measure the amount of time that has elapsed since the most recent receipt of user input. Where the inactivity timer is set to a predetermined time period and configured to be reset in response to the receipt of user input at the computing device, the inactivity timer will only expire after the predetermined time period has elapsed since the inactivity timer was last reset (i.e. if user input has not been received at the computing device for a period of time greater than the predetermined time period).

However, as computing devices become more prevalent, it is becoming more common for users to find themselves interacting, directly or indirectly, with more than one computing device contemporaneously. For example, a user may be alternating, or 'multi-tasking', between interacting with a keyboard and/or mouse of a desktop computer, and interacting with a keypad of a mobile computing device, such as a mobile communication device. As a further example, a user may be browsing the Internet on a tablet computing device while accessing e-mail on a different mobile communication device.

Where a user is alternately interacting with more than one computing device, the time period between successive inputs at a given computing device may be greater than if the user was only interacting with that computing device alone. Accordingly, it may be desirable to set a longer expiry time to prevent the computing device from initiating one or more inactivity responses while the user is still interacting with the computing device. However, the use of longer expiry times may result in reduced security (e.g. where the computing device will take longer to 'lock out' access to sensitive data), or increased power usage (e.g. where the computing device will take longer to enter a sleep state), or both, which may not be desirable. These disadvantages to longer expiry times may be of greater concern where the computing device is powered by a battery, such as where the computing device is a mobile communication device.

At least some embodiments described herein generally relate to methods that facilitate the resetting of an inactivity timer of one computing device in response to a user interaction with another computing device. This may minimize the likelihood that a computing device will initiate an inactivity response while the user is interacting with the other computing device. Also, by maintaining separate, independent inactivity timers for each computing device, configuring each individual computing device to accommodate longer expiry times may not be necessary to prevent inactivity responses from being initiated while a user is still interacting with the computing device. Also, each computing device may be governed by its own independent expiry times for measuring the period of inactivity before an inactivity response is initiated.

In one broad aspect, there is provided a method for resetting an inactivity timer of each of a first and second computing device, the method being performed at the first computing device, the method comprising: establishing a communication channel between the first computing device and the second computing device; receiving, at the first computing device, activity input responsive to a user interaction at the first computing device; in response to the receiving: resetting the inactivity timer of the first computing device, and transmitting a notification via the communication channel to the second computing device that the activity input was received at the first computing device, the inactivity timer of the second computing device being reset in response to receipt of the notification.

In some embodiments, the notification comprises data corresponding to a specific activity input received at the first computing device.

In some embodiments, the notification comprises data corresponding to a general type of activity input received at the first computing device.

In some embodiments, the inactivity timer of one of the first and second computing devices counts toward expiry independently of the inactivity timer of one other of the first and second computing devices.

In some embodiments, the first computing device is operable to reset the inactivity timer of the first computing device in response to receiving, over the communication channel from the second computing device, a second notification that activity input was received at the second computing device.

In some embodiments, the method further comprises determining if the second computing device is in close physical proximity to the first computing device, and the notification is only transmitted to the second computing device if the second computing device is in close physical proximity to the first computing device.

In some embodiments, the second computing device enters a sleep state after the inactivity timer of the second computing device expires.

In some embodiments, a display of the second computing device is dimmed after the inactivity timer of the second computing device expires.

In some embodiments, the second computing device enters a locked state after the inactivity timer of the second computing device expires.

In some embodiments, the first computing device enters a sleep state after the inactivity timer of the first computing device expires.

In some embodiments, after the inactivity timer of the first computing device expires, the first computing device transmits a sleep notification via the communication channel to the second computing device, and the second computing device enters a sleep state in response to receiving the sleep notification.

In some embodiments, a display of the first computing device is dimmed after the inactivity timer of the first computing device expires.

In some embodiments, after the inactivity timer of the first computing device expires, the first computing device transmits a dimming notification via the communication channel to the second computing device, and the second computing device dims a display of the second computing device in response to receiving the dimming notification.

In some embodiments, the first computing device enters a locked state after the inactivity timer of the first computing device expires.

In some embodiments, after the inactivity timer of the first computing device expires, the first computing device transmits a lock notification via the communication channel to the second computing device, and the second computing device enters a locked state in response to receiving the lock notification.

In some embodiments, the inactivity timer of the first computing device expires after a first predetermined time period has elapsed without being reset, the inactivity timer of the second computing device expires after a second predetermined time period has elapsed without being reset, and where the first predetermined time period is greater than the second predetermined time period, the inactivity timer of the second computing device is able to expire before the expiry of the inactivity timer of the first computing device.

In some embodiments, the inactivity timer of the first computing device expires after a first predetermined time period has elapsed without being reset, the inactivity timer of the second computing device expires after a second predetermined time period has elapsed without being reset, and where the first predetermined time period is shorter than the second predetermined time period, the inactivity timer of the first computing device is able to expire before the expiry of the inactivity timer of the second computing device.

In some embodiments, the activity input received at the first computing device comprises at least one of a key actuation, a button actuation, a touchscreen input, a navigation input, or a reorientation of the first computing device.

In another broad aspect, there is provided a first computing device comprising a processor and a memory, the processor configured to execute instructions of one or more application modules, the execution of the one or more application modules causing the processor to: establish a communication channel between the first computing device and a second computing device; receive activity input at the first computing device, the activity input responsive to a user interaction at the first computing device; in response to receiving the activity input, reset an inactivity timer of the first computing device; and in response to receiving the activity input, transmit a notification via the communication channel to the second computing device that the activity input was received at the first computing device, an inactivity timer of the second computing device being reset in response to receipt of the notification.

In some embodiments, the first computing device further comprises a module operable to reset the inactivity timer of the first computing device in response to receiving a notification over the communication channel from the second computing device that activity input responsive to a user interaction at the second computing device was received at the second computing device.

In some embodiments, the first computing device further comprises a module configured to determine if the second computing device is in close physical proximity to the first computing device, and wherein the notification is only transmitted to the second computing device if the second computing device is in close physical proximity to the first computing device.

In some embodiments, the first computing device further comprises a module configured to, after the inactivity timer of the first computing device expires, transmit a sleep notification via the communication channel to the second computing device, the second computing device entering a sleep state in response to receiving the sleep notification.

In some embodiments, the first computing device further comprises a module configured to, after the inactivity timer of the first computing device expires, transmit a dimming notification via the communication channel to the second computing device, the second computing device dimming a display of the second computing device in response to receiving the dimming notification, In some embodiments, the first computing device further comprises a module configured to, after the inactivity timer of the first computing device expires, transmit a lock notification via the communication channel to the second computing device, the second computing device entering a locked state in response to receiving the lock notification.

In some embodiments, at least one of the first computing device or the second computing device comprises a mobile device.

In another broad aspect, there is provided a computer readable storage medium comprising instructions that, when executed by a processor of a first computing device, cause the first computing device to perform acts of a method of resetting an inactivity timer of each of a first and second computing device, the acts comprising: establishing a communication channel between the first computing device and the second computing device; receiving, at the first computing device, activity input responsive to a user interaction at the first computing device; in response to the receiving: resetting the inactivity timer of the first computing device, and transmitting a notification via the communication channel to the second computing device that the activity input was received at the first computing device, the inactivity timer of the second computing device being reset in response to receipt of the notification.

In another broad aspect, there is provided a system comprising two computing devices, each computing device comprising a processor and a memory, the processor of each computing device configured to execute instructions of one or more application modules, the execution of the one or more application modules causing the processor of a respective computing device to receive activity input at the respective computing device, the activity input responsive to a user interaction at the respective computing device; in response to receiving the activity input, reset an inactivity timer of the respective computing device; and in response to receiving the activity input, transmit a notification, via a communication channel established between the two computing devices, from the respective computing device to the other computing device that the activity input was received at the respective computing device, an inactivity timer of the other computing device being reset in response to receipt of the notification.

These and other aspects and features of various embodiments will be described in greater detail below. Embodiments of the present application are not limited to any particular computing device architecture; it is to be understood that alternate embodiments are feasible.

Figure 7:
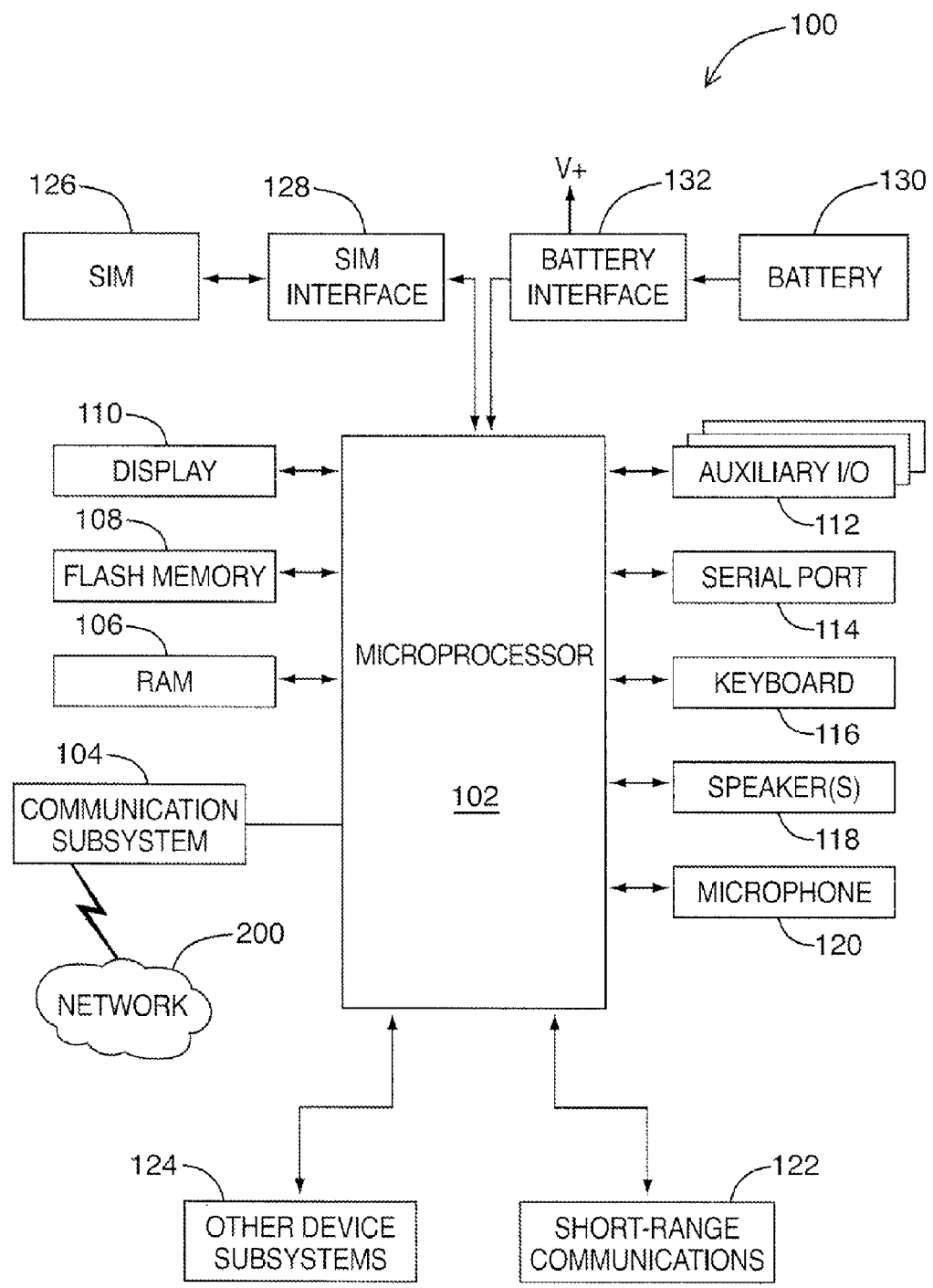
FIG. 7 is a block diagram of a mobile device in one example implementation.

Reference is now made to FIG. 1, which illustrates an example embodiment of a computing device 30 (e.g. mobile device 100 of FIG. 7). The computing device 30 comprises a communication module 31, an input module 32, an inactivity timer 33, a memory 34, a processor 35, and a display 36. The input module 32 is configured to receive input from a user of the computing device, which will be referred to generally as activity input. Activity input may be received in response to a user interaction with an input device associated with the computing device, such as a keyboard, mouse, trackpad, roller ball, touchscreen, microphone (e.g. when receiving voice input), or other input devices. Where the computing device is a mobile communication device, input devices may also include, for example, an orientation sensor such as an accelerometer capable of determining if a user is reorienting the computing device, such as when a user tilts, pans, rotates, or otherwise reorients the computing device. In general, any input received at the computing device that is suitable for inferring that a user is interacting with the computing device may be used as activity input for resetting inactivity timer 33.

Inactivity timer 33 is used to determine if a predetermined period of time has elapsed during which activity input was not received. That is, inactivity timer 33 will expire if it is not reset within the predetermined period of time. Inactivity timer 33 may operate in any suitable fashion, including, for example, a timer that counts down from the predetermined period of time to a zero value, a timer that counts up to the predetermined period of time from a zero value, or a timer that may store an absolute time value equal to the last time the timer was reset plus the predetermined period of time in memory 34, with the timer expiring when the stored absolute time value is equal to a current absolute time. It will be appreciated that other suitable methods of determining if the predetermined period of time has elapsed since the last timer reset may be used in variant embodiments.

Inactivity timer 33 is configured to be reset upon receipt of activity input by input module 32, such that inactivity timer 33 is used to determine whether or not a user is interacting with the computing device. If the predetermined period of time has elapsed without being reset by the receipt of activity input (i.e. if the inactivity timer 33 has expired), a user is likely not interacting with the computing device, and the computing device 30 is configured to perform one or more inactivity responses.

In some embodiments, inactivity responses may include restricting access to at least some data stored on the computing device and requiring an authentication to reestablish access to this data. This may be referred to as the computing device entering a locked state. For example, when computing device 30 is in a locked state, access to a corporate email account or VPN may be 'locked out' after inactivity timer 33 expires, requiring input of a password or other authentication in order to reestablish access to the locked email account or VPN. The scope of the data, application, network access, or other restrictions put in place during such a locked state may include, for example: restricting access to particular data (e.g. access to specific files), to groups or classes of data or applications (e.g. restricting access to work-orientated applications, such as a corporate email account, customer relationship management software, desktop visualization software), to specified network resources (e.g. a VPN), and/or locking out access to the entire computing device.

In some embodiments, inactivity responses may include dimming or otherwise adjusting display 36. For example, a brightness setting of display 36 may be adjusted in order to reduce a power draw of the display 36. Display 36 may alternatively be adjusted to display a screensaver that obfuscates or replaces a user's data being displayed on the display 36, in order to enhance privacy.

In some embodiments, inactivity responses may include placing one or more components of computing device 30 into a powered down state. This may be referred to as the computing device entering a sleep state. For example, when computing device 30 is in a sleep state, display 36 may be turned off, processor 35 may be configured to enter a reduced power mode of operation, volatile memory may be powered down after transferring stored data to a non-volatile memory, etc.

In some embodiments, inactivity responses and their associated predetermined time periods may be specified in accordance with an IT policy, and may be updated from time-to-time. In some embodiments, inactivity responses and their associated predetermined time periods may be configured remotely from the computing device, for example by a system administrator.

In some embodiments, one or more inactivity timers may be used to measure different predetermined periods of time, and the expiry of each inactivity timer may separately initiate one or more inactivity responses. For example, display 36 may be dimmed after 2 minutes have elapsed without receiving activity input, access to a corporate VPN and to a corporate email account may be locked out after 3 minutes have elapsed (i.e. one minute after the display 36 was dimmed), and the computing device may enter a sleep state after 15 minutes have elapsed without inactivity (i.e. 12 minutes after the access lockout).

As discussed above, inactivity timer 33 is configured to be reset upon receipt of activity input by input module 32. In addition to triggering the reset of inactivity timer 33, after receipt of activity input by input module 32, communication module 31 is configured to transmit a notification to a second computing device over a communication channel, the notification indicating that activity input was received at the computing device 30. The notification may include data corresponding to the specific activity input received, data corresponding to the general type of activity input received, or a general notification that activity input of some type was received. For example, if the received activity input was the depression of the "B" key on keyboard associated with the computing device, the notification may include the binary code for the letter B, a more general notification that a keyboard key was actuated (but not that it was the "B" key), or a notification comprising a null input character or some other general indication.

In response to the second computing device receiving the notification, an inactivity timer of the second computing device is reset. In this way, where the communication channel is established and a user is contemporaneously interacting with the first and second computing devices, the second computing device can use a notification of activity input received at the first computing device to determine whether or not a user is likely interacting with the second computing device.

In some embodiments, communications module 31 is further configured to receive a notification from the second computing device that activity input was received at the second computing device, inactivity timer 33 being reset in response to such a notification, such that where the communication channel is established and a user is alternatively interacting with the first and second computing devices, receipt of activity input at either the first or second computing device may reset an inactivity timer on each of the first and second computing devices.

In some embodiments, in addition to performing one or more inactivity responses, after the inactivity timer 33 has expired communication module 31 is configured to transmit an expiry notification to a second computing device over a communication channel, the expiry notification indicating that an inactivity timer of the first computing device 30 has expired. The expiry notification may include data corresponding to the specific inactivity response being performed by the first computing device, or a general notification that the inactivity timer 33 has expired. Non-limiting examples of specific inactivity responses include: if the inactivity response comprises the first computing device entering a locked state, the expiry notification may include a lock notification; if the inactivity response comprises dimming display 36, the expiry notification may include a dimming notification; and if the inactivity response comprises the first computing device entering a sleep state, the expiry notification may include a sleep notification. A more general notification that that the inactivity timer 33 has expired may comprise a null input character or some other general indication.

In response to the second computing device receiving the expiry notification, the second computing device may initiate a corresponding inactivity response. In this way, where the communication channel is established and a user is contemporaneously interacting with the first and second computing devices, the second computing device can use a notification of inactivity at the first computing device to determine whether or not a user is likely interacting with the second computing device.

In some embodiments, communications module 31 is further configured to receive an expiry notification from the second computing device indicating that an inactivity timer of the second computing device has expired, and the first computing device may initiate a corresponding inactivity response in response to such a notification, such that where the communication channel is established and a user is alternatively interacting with the first and second computing devices, expiry of an inactivity timer at either the first or second computing device may trigger an inactivity response on each of the first and second computing devices.

The communication channel may be established by communication module 31 using any suitable wired or wireless protocol, and may be configured as a personal area network (PAN), a point-to-point network, or any other suitable network topology. In some embodiments, a relatively short-range wireless communications protocol such as Bluetooth® or Wireless USB may be used. By using a relatively short-range communications protocol, the communication channel may only be established when the first and second computing devices are in relatively close physical proximity (e.g. within approximately 10 m, or within approximately 3 m) in accordance with some embodiments. In some embodiments, other suitable mechanisms for determining the relative proximity of the two computing devices may be used (e.g. a location of each computing device may be determined by a Global Positioning System (GPS) or an assisted Global Positioning System (aGPS) and compared).

In some embodiments, communications module 31 is configured to automatically establish the communication channel when the computing devices are determined to be in close physical proximity. In other embodiments, the communication channel is established in response to a request from a user to establish the communication channel received at either the first or second computing device. In some embodiments, establishing (or reestablishing) the communication channel requires input of a password or other authentication at either the first or second computing device.

In some embodiments, memory 34 may store a secret shared with a second computing device that may be used to facilitate encrypted communications with the second computing device over the communication channel. In some embodiments, the computing device is configured to obtain the shared secret during an initial setup with the second computing device. In some embodiments, the shared secret is sent to each of the computing devices by a third entity (e.g. in accordance with an IT policy or a security policy). In other embodiments, the shared secret is communicated from the first computing device to the second computing device or vice-versa. In some embodiments, the processor 35 is configured to negotiate a session key with the second computing device over the communication channel, the session key being used as the shared secret for encrypting and decrypting communications between the computing devices. Other signature methods and/or key-exchange algorithms could be used in variant implementations. For example, the shared secret may be derived at each computing device using a SPEKE (Simple Password Exponential Key Exchange) or similar protocol.

Figure 2:
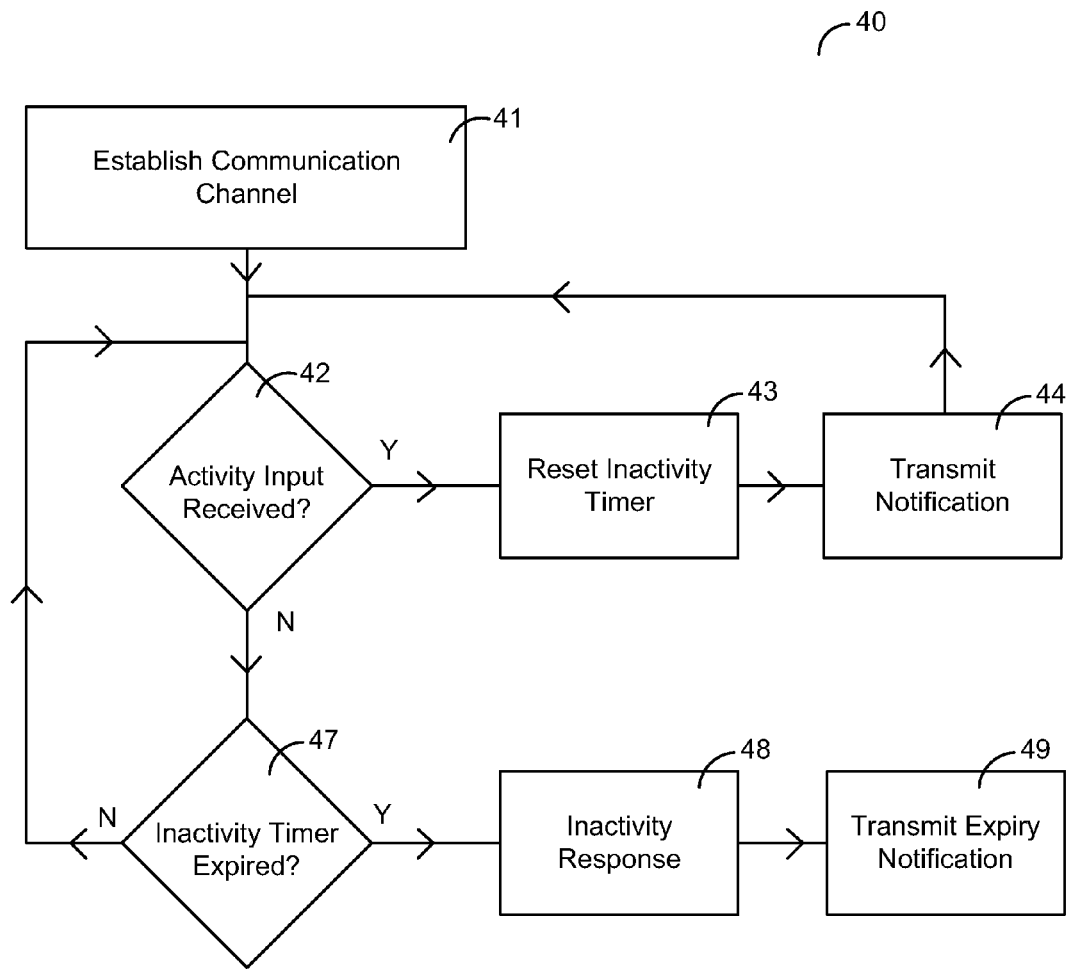
FIG. 2 is a flow diagram illustrating the interaction and sequence of events between a first computing device and a second device, in accordance with at least one embodiment.

An example method for resetting an inactivity timer of each of a first and second computing device, the method being performed at the first computing device, will now be described with reference to FIG. 2, and is shown generally as 40. Some of the details of method 40 have been previously described herein, and the reader is directed to earlier parts of the description for further details At 41, a communication channel is established between the first computing device and the second computing device.

At 42, the first computing device determines if activity input has been received at the first computing device via input module 32 (see FIG. 1). If activity input is received, the method proceeds to 43 where the inactivity timer 33 (see FIG. 1) of the first computing device is reset, and to 44 where a notification of the receipt of activity input is transmitted to the second computing device over the communication channel. In an alternative embodiment (not shown), the order of 43 and 44 may be reversed; that is, the notification may be sent to the second computing device before the inactivity timer 33 is reset.

After 43 and 44, the method returns to 42 to monitor for further activity input at the first computing device.

If activity input is not received at 42, the method proceeds to 47 where the first computing device determines if the inactivity timer 33 of the first computing device has expired (that is, if inactivity timer was not reset by the receipt of activity input within the predetermined period of time). If inactivity timer 33 has not expired, the method returns to 42 to monitor for further activity input at the first computing device. If inactivity timer 33 has expired, at 48 the first computing device initiates an inactivity response associated with the inactivity timer 33.

In some embodiments, if at 47 the inactivity timer 33 has expired, after the first computing device initiates an inactivity response at 48, at 49 an expiry notification is transmitted to the second computing device over the communication channel. In an alternative embodiment (not shown), the order of 48 and 49 may be reversed; that is, the notification may be sent to the second computing device before the inactivity response is initiated.

Figure 3:
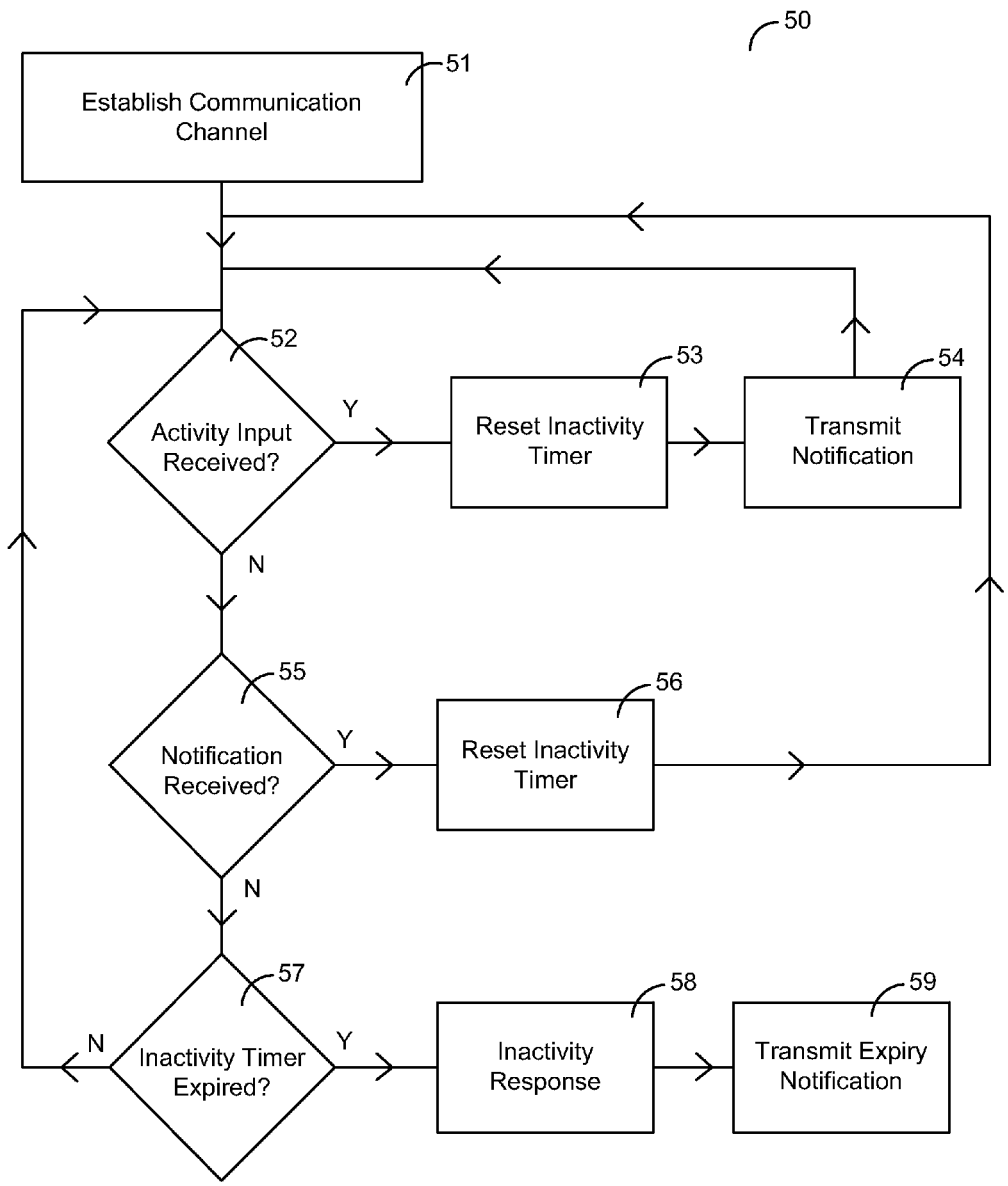
FIG. 3 is a flow diagram illustrating the interaction and sequence of events between a first computing device and a second device, in accordance with at least one other embodiment.

Another example method for resetting an inactivity timer of each of a first and second computing device, the method being performed at the first computing device, will now be described with reference to FIG. 3, and is shown generally as 50. Some of the details of method 50 have been previously described herein, and the reader is directed to earlier parts of the description for further details At 51, a communication channel is established between the first computing device and the second computing device.

At 52, the first computing device determines if activity input has been received at the first computing device via input module 32 (see FIG. 1). If activity input is received, the method proceeds to 53 where the inactivity timer 33 (see FIG. 1) of the first computing device is reset, and to 54 where a notification of the receipt of activity input is transmitted to the second computing device over the communication channel. In an alternative embodiment (not shown), the order of 53 and 54 may be reversed; that is, the notification may be sent to the second computing device before the inactivity timer 33 is reset.

After 53 and 54, the method returns to 52 to monitor for further activity input at the first computing device.

If activity input is not received at 52, the method proceeds to 55 where the first computing device determines if a notification has been received from the second computing device via communications module 31 (see FIG. 1) indicating that activity input was received at the second computing device. If such a notification was received, the method proceeds to 56 where the inactivity timer 33 of the first computing device is reset and then returns to 52 to monitor for further activity input at the first computing device.

If a notification has not been received from the second computing device at 55, the method proceeds to 57, where the first computing device determines if the inactivity timer 33 of the first computing device has expired (that is, if inactivity timer was not reset by the receipt of activity input received at the first computing device or by the receipt of a notification from the second computing device within the predetermined period of time). If inactivity timer 33 has not expired, the method returns to 52 to monitor for further activity input at the first computing device. If inactivity timer 33 has expired, at 58 the first computing device initiates an inactivity response associated with the inactivity timer 33.

In some embodiments, if at 57 the inactivity timer 33 has expired, after the first computing device initiates an inactivity response at 58, at 59 an expiry notification is transmitted to the second computing device over the communication channel. In an alternative embodiment (not shown), the order of 58 and 59 may be reversed; that is, the notification may be sent to the second computing device before the inactivity response is initiated.

Figure 4:
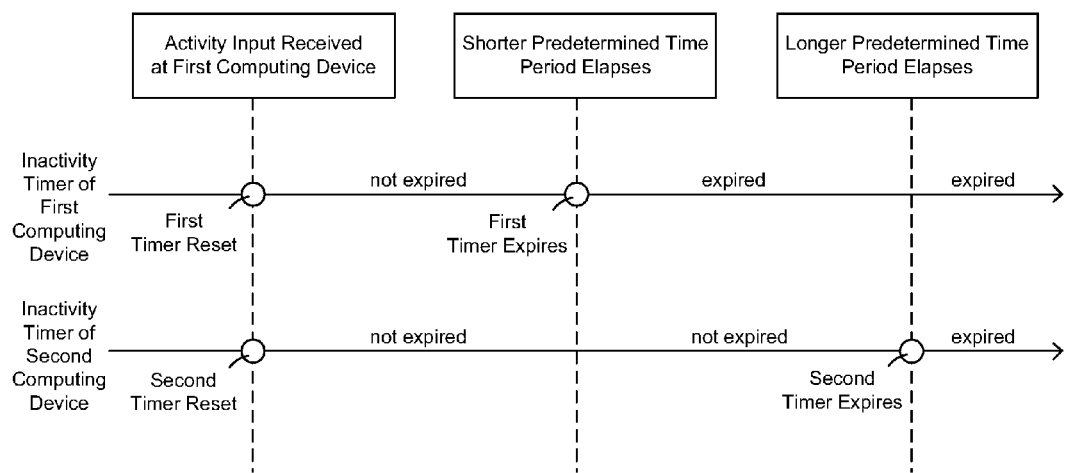
FIG. 4 is an example timeline diagram showing a relative sequence of expiry of the inactivity timers of the first and second computing devices, in accordance with at least one embodiment.
Figure 5:
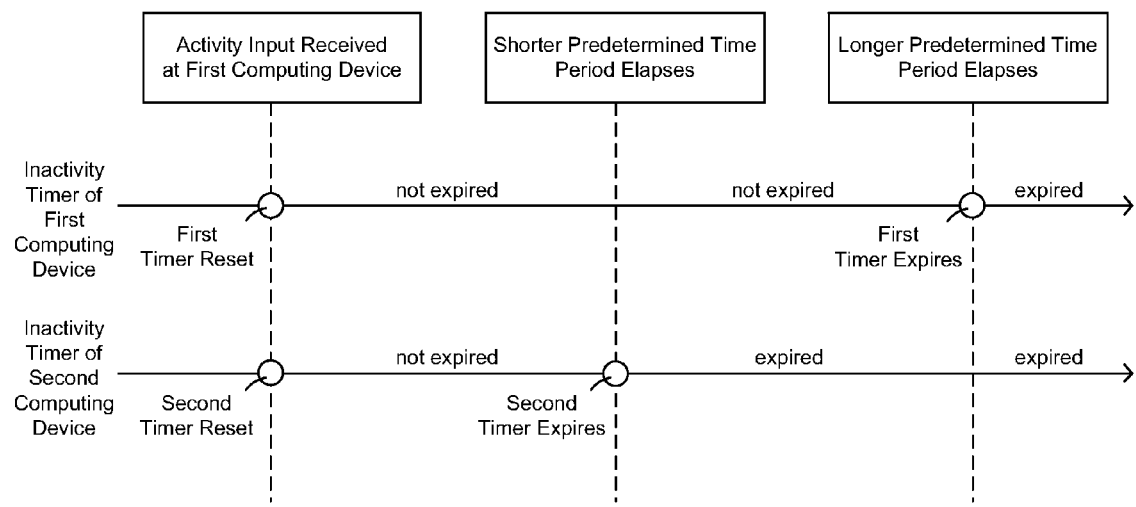
FIG. 5 is another example timeline diagram showing a relative sequence of expiry of the inactivity timers of the first and second computing devices, in accordance with at least one embodiment.

In some embodiments, where an inactivity timer of the first computing device and an inactivity timer of the second computing device are set to expire after different predetermined periods of time, each inactivity timer may expire independently of the inactivity timer on the other computing device. For example, as shown in FIG. 4, if each device is set to enter a locked state upon expiry of its respective inactivity timer, and the inactivity timer of the first computing device is set to expire after a shorter predetermined period of time than the inactivity timer of the second computing device, after the shorter predetermined period of time has elapsed without activity input being received, the first computing device will enter a locked state, but the second computing device will not enter a locked state until the longer predetermined period of time has elapsed. Also, as shown in FIG. 5, if the inactivity timer of the first computing device is set to expire after a longer predetermined period of time than the inactivity timer of the second computing device, after the shorter predetermined period of time has elapsed without activity input being received, the second computing device will enter a locked state, but the first computing device will not enter a locked state until the longer predetermined period of time has elapsed.

Figure 6:
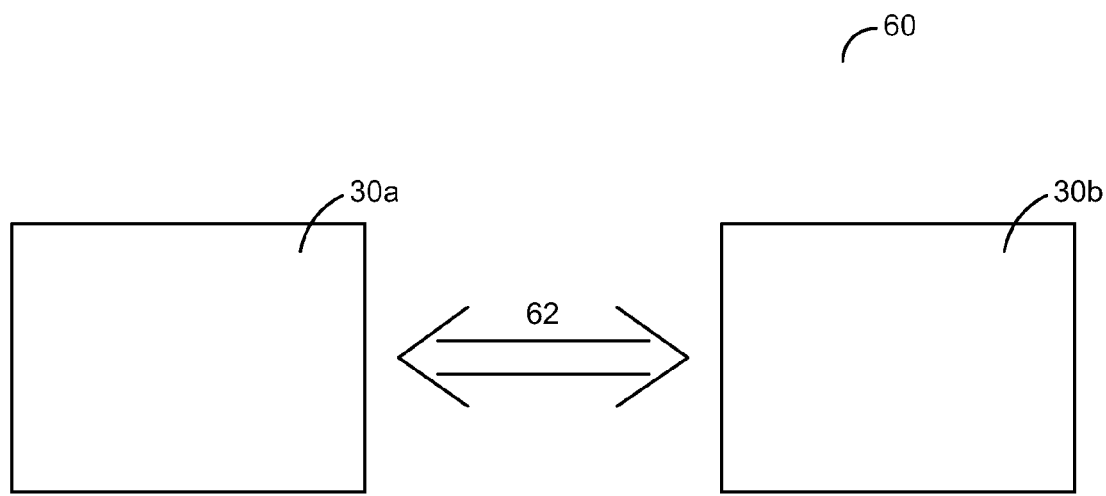
FIG. 6 is a block diagram of a system comprising two computing devices in accordance with at least one embodiment.

An example system comprising two individual computing devices 30*a* and 30*b* is shown as generally as 60 in FIG. 6. In this example, each computing device 30*a*, 30*b* is configured to operate as the communication device 30 discussed above with reference to FIG. 1. That is, a communication channel 62 is established between the two computing devices 30*a* and 30b. Each computing device 30a, 30b is independently capable of receiving activity input responsive to a user interaction at the respective computing device, and in response to receiving the activity input resetting an inactivity timer of the respective computing device, and transmitting a notification that the activity input was received at the respective computing device via the communication channel 62 from the respective computing device to the other computing device. Each computing device 30a, 30b is also independently capable of receiving a notification via the communication channel 62 from the other computing device that activity input was received at the other computing device, and resetting an inactivity timer of the respective computing device in response to receipt of the notification.

Figure 8:
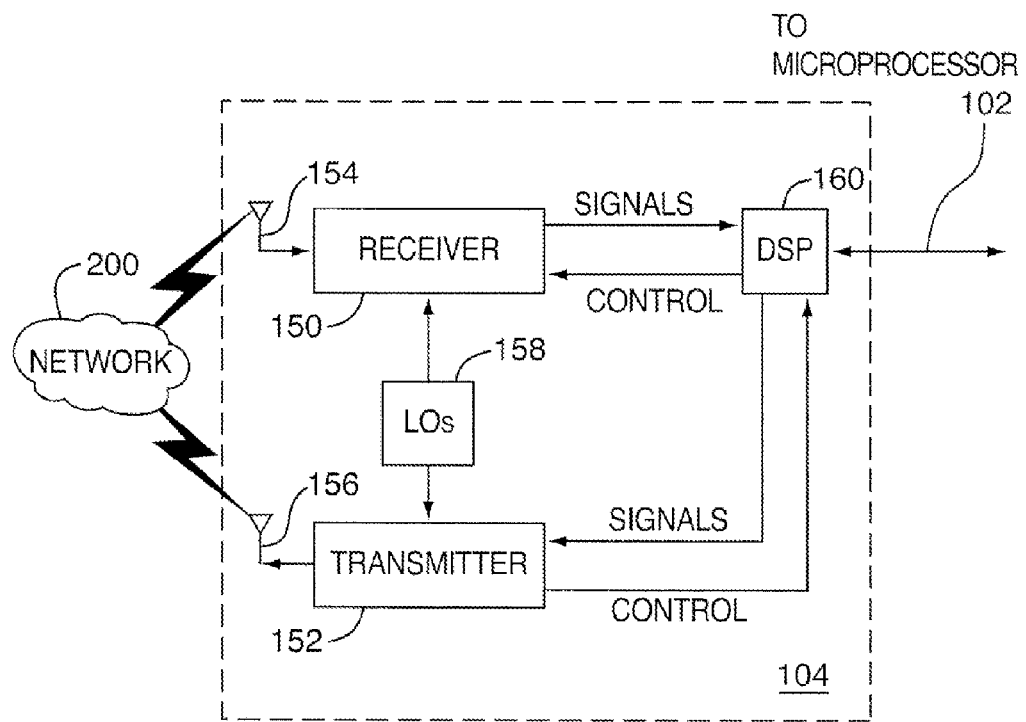
FIG. 8 is a block diagram of a communication sub-system component of the mobile device of FIG. 7.
Figure 9:
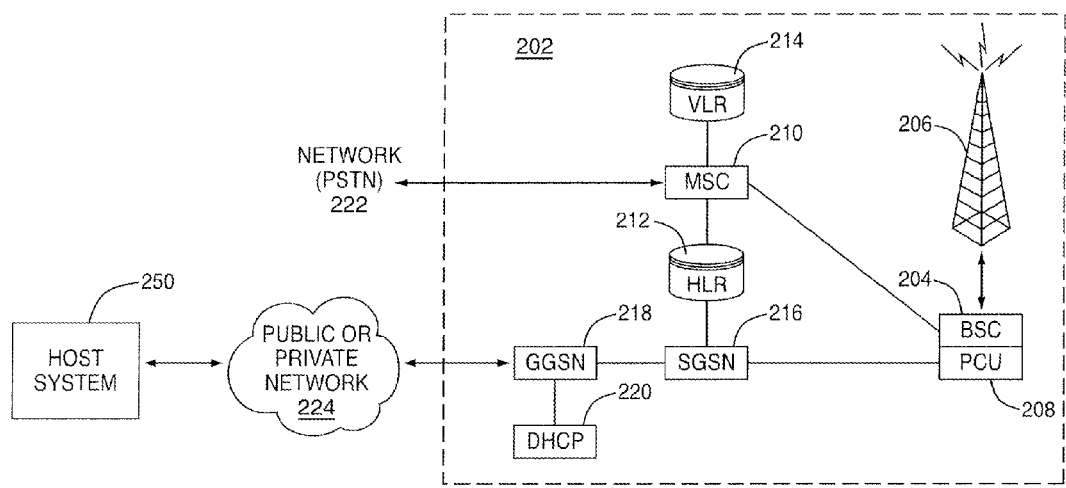
FIG. 9 is a block diagram of a node of a wireless network in one example implementation.

One or more of the computing devices discussed above may be mobile communication devices. Reference is now made to FIGS. 7 to 9 for a general description of an example structure of a mobile communication device and how the mobile device operates and communicates with other devices. The mobile device (sometimes referred to alternatively as a "mobile station" or "portable electronic device") may comprise a two-way communication device with advanced data communication capabilities having the capability to communicate with other computer systems and devices. The mobile device may include the capability for voice communications, data communications or a combination of the two. Depending on the functionality provided by the mobile device, it may be referred to as a smartphone, a data messaging device, a two-way pager, a cellular telephone with data messaging capabilities, a wireless Internet appliance, a laptop computer, a tablet computer, a media player (such as an MP3 player), an electronic book reader or a data communication device (with or without telephony capabilities). In some embodiments, the mobile device may be mounted, installed, or otherwise integrated with a vehicle. Non-limiting examples of a vehicle include: a car, truck, or other automobile; an airplane or other aircraft; and a boat, ship, or other marine vessel. Although a mobile device is described herein by way of illustration, embodiments described herein may be applicable to other computing devices other than mobile devices. For example, embodiments described herein may be applied to other computing platforms that are provided with inactivity timers in variant implementations.

Referring now to FIG. 7 specifically, a block diagram of a mobile device 100 in one example implementation is shown generally. Mobile device 100 comprises a number of components, the controlling component being microprocessor 102. Microprocessor 102 controls the overall operation of mobile device 100. In some embodiments, certain communication functions, including data and voice communications, are performed through communication subsystem 104. Communication subsystem 104 receives messages from and sends messages to a wireless network 200.

In this example implementation of mobile device 100, communication subsystem 104 may be configured for cellular communication in accordance with the Global System for Mobile Communication (GSM) and General Packet Radio Services (GPRS) standards. The GSM/GPRS wireless network is used worldwide and it is expected that other standards such as Enhanced Data GSM Environment (EDGE) and Universal Mobile Telecommunications Service (UMTS) may be employed. These standards are mentioned as examples only, and other standards may be employed on computing devices to which embodiments described herein are applied.

It will be understood by persons skilled in the art that the described embodiments are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

The wireless network associated with mobile device 100 may comprise a GSM/GPRS wireless network in one example implementation of mobile device 100; however, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and n-generation (e.g. 2.5G, 3G, 3.5G, 4G, etc.) networks like EDGE, UMTS, High-Speed Downlink Packet Access (HSDPA), High-Speed Uplink Packet Access (HSUPA), High-Speed Packet Access (HSPA), Long Term Evolution (LTE), 3GPP LTE, LTE Advanced, WiMax, and Flash-OFDM, etc. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, one or more speakers 118, microphone 120, short-range communication subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator, media player or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

In some embodiments, mobile device 100 may send and receive communication signals over network 200 after network registration or activation procedures have been completed. Network access is associated with a subscriber or user of a mobile device 100. To identify a subscriber, mobile device 100 may use a Subscriber Identity Module or "SIM" card 126 inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 may not be fully operational for communication with network 200.

By inserting SIM 126 into SIM interface 128, a subscriber can access all subscribed services. Services could include: web browsing and messaging such as e-mail, voice mail, Short Message Service (SMS), media transfers (such as music downloading or streaming), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that subscribers are not necessarily bound by any single physical mobile device. SIM 126 may store additional subscriber information for a mobile device as well, including datebook (or calendar) information and recent call information. In certain embodiments SIM 126 may be a different type of user identifier and may be integral to mobile device 100 or not present at all. By way of further examples, a Universal Integrated Circuit Card (UICC), eUICC (Embedded UICC), Removable User Identity Module (R-UIM), CDMA Subscriber Identity Module (CSIM), or Universal Subscriber Identity Module (USIM) may be employed.

Mobile device 100 includes a power pack that supplies power to electronic components and that supports portability. The power pack may be of any type, but for clarity it will be assumed that mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed in flash memory 108 (or other non-volatile storage) on mobile device 100 during its manufacture.

Additional applications may also be loaded onto mobile device 100 through network 200, auxiliary I/O subsystem 112, serial port 114, short-range communications subsystem 122, or the other device subsystems 124. This flexibility in application installation increases the functionality of mobile device 100 and may provide enhanced on-device functions, communication-related functions, or both. For example, secure communication applications may enable electronic commerce functions and other such financial transactions to be performed using mobile device 100. Numerous other types of applications may be loaded onto mobile device 100 or other computing devices, including without limitation, messaging applications (e.g. e-mail, text, instant, video, etc.), voice communication applications, calendar applications, address book applications, utility applications, browser application, media player (e.g. audio, video, etc.) applications, social network applications, camera applications, gaming applications, productivity applications, etc.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

It should be noted that the term "download" and forms thereof as used herein, in the specification and in the claims, are used generally to describe a transfer of data from one system to another, and is not intended to be limiting with regards to the origin or destination of the transfer, for example. Accordingly, where the term "download" and forms thereof are used in the specification and in the claims, it is intended to encompass other forms of transfers including, for example, an "upload" or a "sideload" of data (e.g. a Universal Serial Bus (USB) sideload).

Short-range communications subsystem 122 provides for wireless device connections to enable communication between mobile device 100 and different systems or devices, without the use of network 200. For example, subsystem 122 may include an infrared device and associated circuits and components for short-range communication. Examples of short range communication would include standards developed by the Infrared Data Association (IrDA), Near Field Communication (NFC), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Keyboard 116 may be an alphanumeric keyboard and/or telephone-type keypad. A composed item may be transmitted over network 200 through communication subsystem 104.

Auxiliary I/O subsystem 112 may include devices such as: a touch screen, mouse, infrared fingerprint detector, or a roller wheel with a dynamic button actuation (e.g. pressing) capability. Auxiliary I/O subsystem 112 may also include an orientation sensor for determining a relative spatial orientation of mobile device 100 (e.g. a particular spatial orientation of mobile device 100 in the physical world) and for detecting a change in the device's spatial orientation. Such an orientation sensor can be any of the known sensors in the art, for example an accelerometer, a tilt sensor, an inclinometer, a gravity based sensor, and a Micro-Electro-Mechanical (MEM) system that can include one of the above types of sensors on a micro-scale. Further, auxiliary I/O subsystem 112 may comprise a two-dimensional navigation (or scrolling) component, such as a track ball, a joystick or a directional pad, each optionally with a dynamic button actuation (e.g. pressing) capability. User input components comprised in auxiliary I/O subsystem 112 may be used by the user to navigate and interact with a user interface of mobile device 100.

For voice communications, the overall operation of mobile device 100 is substantially similar, except that the received signals would be output to the one or more speakers 118, and signals for transmission would be generated by microphone 120. Alternative voice or audio I/O subsystems, such as a voice message recording subsystem, may also be implemented on mobile device 100. Although voice or other audio signal output is accomplished primarily through the one or more speakers 118, display 110 may also be used to provide additional information such as the identity of a calling party, duration of a voice call, or other voice call related information. Microphone 120 can receive a supply of power, in the form of a bias voltage and bias current, from the rechargeable battery 130. Different types and configurations of microphone 120 can be incorporated into the mobile device 100.

Referring now to FIG. 8 specifically, a block diagram of the communication subsystem 104 of FIG. 7 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 8 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 9 specifically, a block diagram of a node of a wireless network is shown as 202. In this example embodiment, the network and its components are described for operation with General Packet Radio Service (GPRS) and Global Systems for Mobile (GSM) technologies. However, it should be understood that in other embodiments the network can be implemented in accordance with other communication protocols. In practice, network 200 comprises one or more nodes 202. Mobile device 100 communicates with a node 202 within wireless network 200. The node 202 is configured in accordance with GPRS and GSM technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 may be a fixed transceiver station, in which case the station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, GPRS capable networks use private, dynamically assigned IP addresses and thus use a DHCP server 220 connected to the GGSN 218. There are many mechanisms for dynamic IP assignment, including using a combination of a Remote Authentication Dial-In User Service (RADIUS) server and DHCP server.

Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

A host system 250 may be accessible, via network 224 for example, to the first computing device, the second computing device, or both.

Some of the acts of one or more methods described herein may be provided as software instructions, stored on computer-readable storage media and executable by a processor. Examples of computer-readable storage media may include a hard disk, a floppy disk, an optical disk (e.g. a compact disk, a digital video disk), a flash drive or flash memory, magnetic tape, and memory. Other configurations are possible as well.

In variant implementations, some of the acts of one or more methods described herein may be provided as executable software instructions stored in transmission media.

It should also be noted that at least some of the elements used to perform at least one of the methods of resetting an inactivity timer of each of a first and second computing device described that are implemented via software may be written in a high-level procedural language such as object oriented programming. Accordingly, the program code may be written in C, C++ or any other suitable programming language and may comprise modules or classes, as is known to those skilled in object oriented programming. Alternatively, in addition thereto, at least some of these elements implemented via software may be written in assembly language, machine language or firmware as needed. In either case, the program code can be stored on a storage media or on a computer readable medium that is readable by a general or special purpose programmable computing device having a processor, an operating system and the associated hardware and software that is necessary to implement the functionality of at least one of the methods of selecting a communication mode described herein. The program code, when read by a processor, configures the processor to operate in a new, specific and predefined manner in order to perform at least one of the methods of resetting an inactivity timer of each of a first and second computing device described herein.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. Accordingly, what has been described above is intended to be illustrative of the claimed concept and non-limiting. It will be understood by persons skilled in the art that variations are possible in variant implementations and embodiments.

The invention claimed is:

1. A method for resetting an inactivity timer of each of a first and second computing device, the method being performed at the first computing device, the method comprising:
   establishing a communication channel between the first computing device and the second computing device;
   receiving, at the first computing device, activity input responsive to a user interaction at the first computing device;
   in response to the receiving:
      resetting the inactivity timer of the first computing device, and
      transmitting a notification via the communication channel to the second computing device that the activity input was received at the first computing device, the inactivity timer of the second computing device being reset in response to receipt of the notification.

2. The method of claim 1, wherein the notification comprises data corresponding to a specific activity input received at the first computing device.

3. The method of claim 1, wherein the notification comprises data corresponding to a general type of activity input received at the first computing device.

4. The method of claim 1, wherein the inactivity timer of one of the first and second computing devices counts toward expiry independently of the inactivity timer of one other of the first and second computing devices.

5. The method of claim 1, wherein the first computing device is operable to reset the inactivity timer of the first computing device in response to receiving, over the communication channel from the second computing device, a second notification that activity input was received at the second computing device.

6. The method of claim 1, further comprising determining if the second computing device is in close physical proximity to the first computing device, and wherein the notification is only transmitted to the second computing device if the second computing device is in close physical proximity to the first computing device.

7. The method of claim 1, wherein the second computing device enters a sleep state after the inactivity timer of the second computing device expires.

8. The method of claim 1, wherein a display of the second computing device is dimmed after the inactivity timer of the second computing device expires.

9. The method of claim 1, wherein the second computing device enters a locked state after the inactivity timer of the second computing device expires.

10. The method of claim 1, wherein the first computing device enters a sleep state after the inactivity timer of the first computing device expires.

11. The method of claim 10, further comprising, after the inactivity timer of the first computing device expires, the first computing device transmitting a sleep notification via the communication channel to the second computing device, and the second computing device entering a sleep state in response to receiving the sleep notification.

12. The method of claim 1, wherein a display of the first computing device is dimmed after the inactivity timer of the first computing device expires.

13. The method of claim 12, further comprising, after the inactivity timer of the first computing device expires, the first computing device transmitting a dimming notification via the communication channel to the second computing device, and the second computing device dimming a display of the second computing device in response to receiving the dimming notification.

14. The method of claim 1, wherein the first computing device enters a locked state after the inactivity timer of the first computing device expires.

15. The method of claim 14, further comprising, after the inactivity timer of the first computing device expires, the first computing device transmitting a lock notification via the communication channel to the second computing device, and the second computing device entering a locked state in response to receiving the lock notification.

16. The method of claim 1, wherein the inactivity timer of the first computing device expires after a first predetermined time period has elapsed without being reset, the inactivity timer of the second computing device expires after a second predetermined time period has elapsed without being reset, and wherein the first predetermined time period is greater than the second predetermined time period, such that the inactivity timer of the second computing device is able to expire before the expiry of the inactivity timer of the first computing device.

17. The method of claim 1, wherein the inactivity timer of the first computing device expires after a first predetermined time period has elapsed without being reset, the inactivity timer of the second computing device expires after a second predetermined time period has elapsed without being reset, and wherein the first predetermined time period is shorter than the second predetermined time period, such that the inactivity timer of the first computing device is able to expire before the expiry of the inactivity timer of the second computing device.

18. The method of claim 1, wherein the activity input received at the first computing device comprises at least one of a key actuation, a button actuation, a touchscreen input, a navigation input, or a reorientation of the first computing device.

19. A first computing device comprising a processor and a memory, the processor configured to execute instructions of one or more application modules, the execution of the one or more application modules causing the processor to:
    establish a communication channel between the first computing device and a second computing device;
    receive activity input at the first computing device, the activity input responsive to a user interaction at the first computing device;
    in response to receiving the activity input, reset an inactivity timer of the first computing device; and
    in response to receiving the activity input, transmit a notification via the communication channel to the second computing device that the activity input was received at the first computing device, an inactivity timer of the second computing device being reset in response to receipt of the notification.

20. The first computing device of claim 19, wherein the notification comprises data corresponding to a specific activity input received at the first computing device.

21. The first computing device of claim 19, wherein the notification comprises data corresponding to a general type of activity input received.

22. The first computing device of claim 19, wherein the inactivity timer of one of the first and second computing devices counts toward expiry independently of the inactivity timer of one other of the first and second computing devices.

23. The first computing device of claim 19, wherein the execution of the one or more application modules further causes the processor to reset the inactivity timer of the first computing device in response to receiving a notification over the communication channel from the second computing device that activity input responsive to a user interaction at the second computing device was received at the second computing device.

24. The first computing device of claim 19, wherein the execution of the one or more application modules further causes the processor to determine if the second computing device is in close physical proximity to the first computing device, and wherein the notification is only transmitted to the second computing device if the second computing device is in close physical proximity to the first computing device.

25. The first computing device of claim 19, wherein the second computing device enters a sleep state after the inactivity timer of the second computing device expires.

26. The first computing device of claim 19, wherein a display of the second computing device is dimmed after the inactivity timer of the second computing device expires.

27. The first computing device of claim 19, wherein the second computing device enters a locked state after the inactivity timer of the second computing device expires.

28. The first computing device of claim 19, wherein the first computing device enters a sleep state after the inactivity timer of the first computing device expires.

29. The first computing device of claim 28, wherein the execution of the one or more application modules further causes the processor to, after the inactivity timer of the first computing device expires, transmit a sleep notification via the communication channel to the second computing device, the second computing device entering a sleep state in response to receiving the sleep notification.

30. The first computing device of claim 19, wherein a display of the first computing device is dimmed after the inactivity timer of the first computing device expires.

31. The first computing device of claim 30, wherein the execution of the one or more application modules further causes the processor to, after the inactivity timer of the first computing device expires, transmit a dimming notification via the communication channel to the second computing device, the second computing device dimming a display of the second computing device in response to receiving the dimming notification.

32. The first computing device of claim 19, wherein the first computing device enters a locked state after the inactivity timer of the first computing device expires.

33. The first computing device of claim 32, wherein the execution of the one or more application modules further causes the processor to, after the inactivity timer of the first computing device expires, transmit a lock notification via the communication channel to the second computing device, the second computing device entering a locked state in response to receiving the lock notification.

34. The first computing device of claim 19, wherein the inactivity timer of the first computing device expires after a first predetermined time period has elapsed without being reset, the inactivity timer of the second computing device expires after a second predetermined time period has elapsed without being reset, and wherein the first predetermined time period is greater than the second predetermined time period, such that the inactivity timer of the second computing device is able to expire before the expiry of the inactivity timer of the first computing device.

35. The first computing device of claim 19, wherein the inactivity timer of the first computing device expires after a first predetermined time period has elapsed without being reset, the inactivity timer of the second computing device expires after a second predetermined time period has elapsed without being reset, and wherein the first predetermined time period is shorter than the second predetermined time period, such that the inactivity timer of the first computing device is able to expire before the expiry of the inactivity timer of the second computing device.

36. The first computing device of claim 19, wherein at least one of the first computing device or the second computing device comprises a mobile device.

37. A non-transitory computer readable storage medium comprising instructions that, when executed by a processor of a first computing device, cause the first computing device to reset an inactivity timer of each of a first and second computing device by:
    establishing a communication channel between the first computing device and the second computing device;
    receiving, at the first computing device, activity input responsive to a user interaction at the first computing device;
    in response to the receiving:
        resetting the inactivity timer of the first computing device, and
        transmitting a notification via the communication channel to the second computing device that the activity input was received at the first computing device, the inactivity timer of the second computing device being reset in response to receipt of the notification.

38. The medium of claim 37, wherein at least one of the first computing device or the second computing device comprises a mobile device.

39. A system comprising two computing devices, each computing device comprising a processor and a memory, the processor of each computing device configured to execute instructions of one or more application modules, the execution of the one or more application modules causing the processor of a respective computing device to:
    receive activity input at the respective computing device, the activity input responsive to a user interaction at the respective computing device;
    in response to receiving the activity input, reset an inactivity timer of the respective computing device; and
    in response to receiving the activity input, transmit a notification, via a communication channel established between the two computing devices, from the respective computing device to the other computing device that the activity input was received at the respective computing device, an inactivity timer of the other computing device being reset in response to receipt of the notification.

* * * * *